(12) United States Patent
Kubler et al.

(10) Patent No.: US 7,206,338 B1
(45) Date of Patent: Apr. 17, 2007

(54) MODEM COMMAND INTERFACE FOR RADIO DEVICES

(75) Inventors: Joseph J. Kubler, Boulder, CO (US); John M. Bleichner, Marion, IA (US)

(73) Assignee: Intermec IP Corp., Everett, WA (US)

( * ) Notice: Subject to any disclaimer, the term of this patent is extended or adjusted under 35 U.S.C. 154(b) by 610 days.

(21) Appl. No.: 09/706,592

(22) Filed: Nov. 3, 2000

Related U.S. Application Data (60) Provisional application No. 60/163,752, filed on Nov. 5, 1999.

(51) Int. Cl.
*H04B 1/38* (2006.01)
*H04M 11/00* (2006.01)
*H04Q 7/20* (2006.01)

(52) U.S. Cl. .................... 375/222; 379/93.32; 455/517

(58) Field of Classification Search ................ 375/222, 375/219, 377; 455/462, 425, 426.1, 426.2, 455/553.1, 554.1, 554.2, 466, 500, 507, 517; 379/93.05, 93.26, 93.28, 93.31, 93.32, 90.01; 709/200, 221; 703/21–23; 726/5
See application file for complete search history.

(56) References Cited

U.S. PATENT DOCUMENTS

| | | | | | |
|---|---|---|---|---|---|
| 5,408,520 | A | * | 4/1995 | Clark et al. ............... | 379/93.07 |
| 5,487,175 | A | * | 1/1996 | Bayley et al. ............ | 455/422.1 |
| 5,535,242 | A | * | 7/1996 | Brigida et al. .............. | 375/222 |
| 5,570,389 | A | * | 10/1996 | Rossi ......................... | 375/220 |
| 5,574,773 | A | * | 11/1996 | Grob et al. ................. | 455/466 |
| 5,901,284 | A | * | 5/1999 | Hamdy-Swink ............... | 726/5 |
| 6,327,476 | B1 | * | 12/2001 | Koscal ....................... | 455/462 |
| 6,363,335 | B1 | * | 3/2002 | Monroe et al. ............... | 703/21 |

OTHER PUBLICATIONS

Cass Lewart, "Modem Handbook for the Communications Professional".*

* cited by examiner

*Primary Examiner*—Tesfaldet Bocure
*Assistant Examiner*—Vineeta Panwalkar (57) ABSTRACT

A method of establishing a network may comprise formatting network establishment parameters into a standard modem command, sending the standard modem command, and extracting the network establishment parameters from the standard modem command. A method of communicating with a device may comprise creating a standard modem command by appending a modem command to a device command and sending the standard modem command to a device. Performance of a method in accordance with the present invention may realize a wireless communication system in accordance with the present invention.

20 Claims, 6 Drawing Sheets

MODEM COMMAND INTERFACE FOR RADIO DEVICES

CROSS REFERENCE TO RELATED APPLICATION

The present application claims the benefit of provisional Application No. 60/163,752 filed Nov. 5, 1999. Said provisional Application No. 60/163,752 is hereby incorporated by reference in its entirety including Appendix A.

FIELD OF THE INVENTION

The present invention relates to communication between or among devices in a network. In particular, the present invention relates to communication in a wireless network.

BACKGROUND

Networks link one or more computer devices to one another and facilitate the communication or transfer of information between or among the devices in the network. A network may be as complex as a planet wide web of inter connected computers such as the World Wide Web, or in contrast, a network may be as simple as a temporary communication link between two computer devices. Between these two extremes there may exist an infinite number of different types of networks, each having a differing level of complexity.

Computer devices may be connected in a network via a physical connection such as a wire, cable, or fiber optic connection, or alternatively, computer devices in a network may be connected via a wireless connection. In a wireless network data is embedded on an electromagnetic signal and is sent through free space from one wireless device to another wireless device. Typically, to participate in a wireless network, a device must be equipped with a transmitter for transmitting electromagnetic energy or a receiver for receiving electromagnetic energy. Often, a wireless communication device will be equipped with a transceiver that facilitates both the transmission and reception of electromagnetic energy. In addition, antennas may be used to enhance the transmission and reception capabilities of wireless computer devices.

Establishing a communication link between two or more wireless devices generally requires that the two devices "speak the same language." In other words, effective communication between two or more wireless devices requires that the devices be programmed to understand one another. Often, network configuration parameters must be exchanged between the wireless devices before effective communication between the devices can occur.

Depending on the devices used in the wireless network, their respective protocols and the complexity of the network, the amount of time and action necessary to configure wireless devices for effective communication may vary. Typically, however, an end user must take some action to enable wireless devices to communicate in a network. Simplifying the configuration process and reducing the amount of action that an end user must undertake to operate a device in a wireless network can save both time and energy. Therefore, improving the methods by which wireless networks may be established and improving the methods by which wireless devices communicate are paramount concerns.

SUMMARY OF THE INVENTION

The present invention may comprise an innovative method of communicating network establishment parameters from at least one wireless computer device to one or more other wireless computer devices. The method may comprise formatting the network establishment parameters into a standard modem command. The method may also comprise sending the standard modem command from a first device to a second device, and extracting the network establishment parameters from the standard modem command.

In accordance with the present invention, the standard modem command may be any modem command that may be understood by a modem. In one embodiment, the standard modem command may include at least one command taken from the Hayes command set. By way of example, the standard modem command may be a start command or a dial command. However, any standard modem command could be used in accordance with the present invention.

Some computer devices in a network may have memory capabilities. The memory may be volatile or non-volatile. In accordance with one embodiment of the present invention, the method of communicating network establishment parameters may further comprise storing at least some of the parameters to memory. In one specific embodiment, the parameters may be stored in an electrically erasable programmable read only memory (EEPROM). In any case, depending on the hardware being used and the network being configured, the parameters may be stored either temporarily or permanently.

In another embodiment, the present invention may comprise a method of communicating with a device. In accordance with this embodiment, the device may be programmed to understand one or more standard modem commands. Moreover, the standard modem commands may include at least one Hayes modem command. The method may comprise creating a standard modem command by appending a Hayes modem command to a device command and sending the standard modem command to the device. The device command may provide network establishment parameters, or alternatively the device command may command the device to perform a particular function. By way of example, the device command may command the device to enable or disable a particular device function. Alternatively, the device command may simply instruct the device to adjust its settings or operation parameters. In any case, the type of device command that may be implemented in accordance with the present invention is limited only by the hardware and software used in the device.

In still another embodiment, the present invention may comprise a method of communicating between a first device and a second device. Both the first and second device may be programmed to understand standard modem commands. The method may comprise creating a standard modem command by appending a Hayes modem command to a device command in the first device. The method may also comprise sending the standard modem command from the first device to the second device. Moreover, the method may comprise extracting the device command from the standard modem command in the second device. As described above, the type of device command that may be implemented would be limited only by the hardware and software used in the respective devices.

In yet another embodiment, the present invention may comprise a method of establishing a wireless communication link with a device. In accordance with this embodiment the device may be programmed to understand standard modem commands. The method may comprise formatting wireless network establishment information into a standard modem command and sending the standard modem command to the device.

In an alternative embodiment, the present invention may comprise a method of communicating with a radio device in a wireless local area network. The method may comprise establishing a communication link by formatting network establishment information into a standard modem command and sending the standard modem command to the radio device. The method may further comprise communicating data over the communication link. In accordance with this embodiment, the radio device may be any device having electromagnetic radiation reception capabilities. By way of example and not limitation the radio device may be any on of the following devices when they are equipped with a receiver: a hand held computer, a printer, a scanner, a bar code reader, a RFID tag reader, a personal computer, any computer peripheral device, a key board, a facsimile machine, a disk drive, a mouse, a display screen, a communication device, an access point, a bridge, a router, a gate, a sensor, a security device, or any other device having electromagnetic radiation reception capabilities.

In an additional embodiment, the present invention may comprise a wireless communication system. The system may comprise at least one first wireless device and at least one second wireless device. Moreover the system may comprise at least one network establishment signal having network establishment information formatted into a standard modem command. Wireless communication between the first wireless device and the second wireless device may be established when the network establishment signal is sent from the first wireless device and received by the second wireless device. In this manner, a wireless communication system may be created. The system may further comprise multiple wireless devices. Moreover, by way of example and not limitation the wireless devices each may be any one of the radio devices listed above.

In another embodiment, the present invention may comprise a method of communicating to a radio device. The method may comprise creating a standard modem command by appending a modem interface command to a device command. The method may further comprise sending the standard modem command to the radio device.

In yet another embodiment, the present invention may comprise a method of communicating from a radio device. The method may comprise creating a standard modem command by appending a modem interface command to a device command and sending the standard modem command from the radio device.

The advantages of the present invention may be apparent from the forgoing description or the description that follows, or may be learned by practice of the present invention. The advantages of the systems and methods of the present invention will be realized and attained by means particularly pointed out in the written description and claims, as well as in the appended drawings. It is to be understood, however, that both the foregoing summary and the following detailed description are explanatory only, and not restrictive of the present invention, as claimed. In addition, in light of this disclosure, other embodiments and modifications will become apparent to one with ordinary skill in the art and are meant to fall within the spirit and scope of the invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE INVENTION

The present invention may comprise a new and innovative method of communicating between or among devices in a wireless computer network. The invention may be used to establish a network, or it may be used to facilitate communication in a network. It may be used to communicate with one device, or it may be used to communicate between or among many devices. Moreover, it may be used to communicate either to or from a wireless device. When a wireless communication network has been established using the methods of the present invention, the result may be a wireless communication system in accordance with the present invention.

Figure 1:
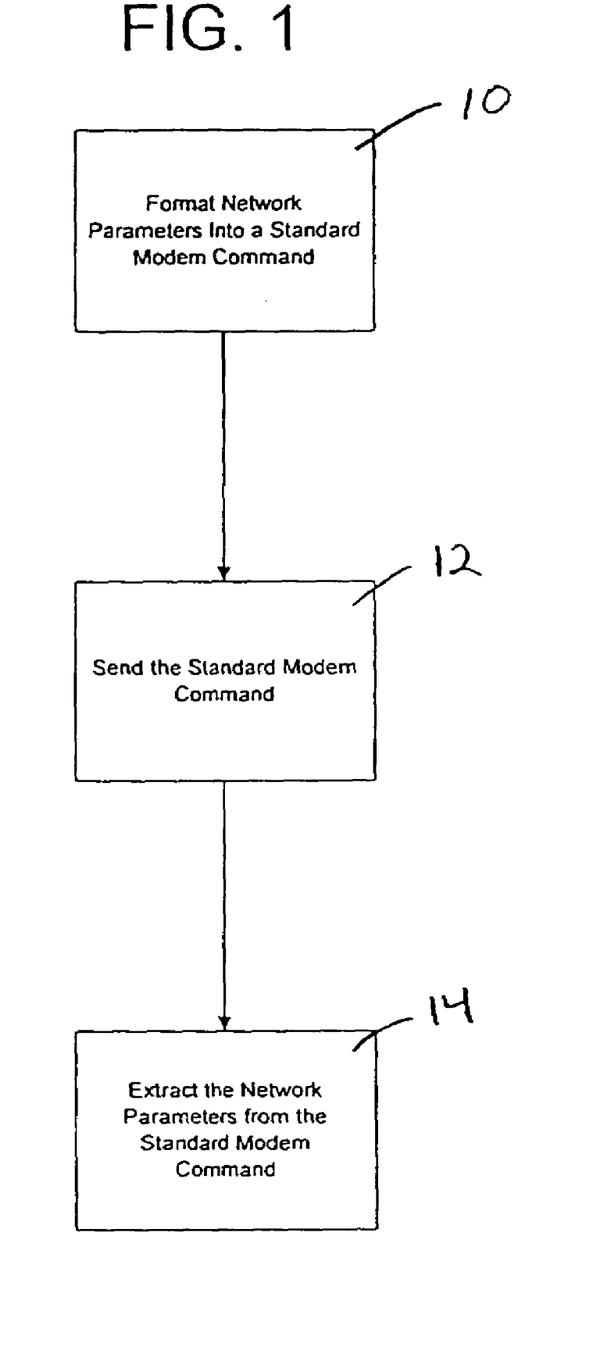
FIG. 1 is a flow diagram showing a method of communicating network parameters in accordance with the present invention.

FIG. 1 is a flow diagram showing a method of communicating network parameters in accordance with the present invention. The method may comprise formatting network parameters into a standard modem command 10 and sending the standard modem command 12. In addition, the method may comprise extracting the network parameters from the standard modem command 14.

The present invention may utilize standard modem concepts and commands currently known in the art and may integrate those concepts and standards into a new method of communication. As such, conventional hardware and pre-existing software may be used to implement a method in accordance with the present invention.

Network establishment parameters may be formatted into a standard modem command by combining the network parameters with at least one modem interface command. In some embodiments the modem interface command may be a basic Hayes modem command. A basic Hayes modem command is a command taken from the industry accepted "Hayes Modem Interface Commands." The following exemplary embodiment illustrates how step 10 of FIG. 1 may be realized using exemplary Hayes modem commands.

The Hayes modem command "AT" is a basic start command that tells a modem that you are going to send something. The Hayes modem command "D" tells a modem to dial the numbers following the D. Thus the traditional modem command ATDphonenumber will command the modem to dial "phonenumber". In accordance with the present invention a standard modem command may be formatted by letting phonenumber=[network establishment parameters]. Thus, the resulting modem command ATDphonenumber would contain two modem interface commands ("AT" and "D") and would also contain network establishment parameters embedded in the phonenumber.

If a device were used to format the standard modem command, the device would not need to know that phonenumber=[network establishment parameters]. In other words, the formatting device may simply operate as though it were formatting and sending a traditional modem command that instructed a modem to dial the phonenumber. However, a device that receives the standard modem command may be programmed independently to realize that phonenumber=[network establishment parameters]. As such the receiving device may extract the network establishment parameters from the standard modem command simply by extracting phonenumber from the standard modem command ATDphonenumber. Although the sending device may think it is sending a "dial phone number command", the receiving device may interpret the command as containing network establishment parameters and may use the network establishment data accordingly.

Referring again to FIG. 1, a method in accordance with the present invention may comprise sending a standard modem command 12. This step may be realized by any method of data transmission between at least one data sending device and at least one data receiving device. In the preferred embodiment the data is embedding on an electromagnetic and is sent wirelessly from a sending device to a receiving device. The data may be embedded on either a digital or an analog signal using methods known in the art. Although the signal could theoretically be sent at any frequency, technological limitations and governmental regulation may limits on what signal frequency could be effective. For small wireless devices implementing the present invention may be best realized when the signal is sent at approximately one of the following frequency ranges: 400–500 MHz, 900–905 MHz, or 2.3–2.5 GHz. In addition, frequency hopping techniques or other data transmission techniques may be used to enhance the quality of data transmission.

The standard modem command may be sent from a first device to a second device. Once it has been successfully sent, the network parameters may be extracted from the standard modem command 14. As mentioned above, a second device that receives the standard modem command may be programmed independently to realize that phonenumber=[network establishment parameters] while the first device may or may not be so programmed. The second device may extract the network establishment parameters from the standard modem command simply by extracting phonenumber from the standard modem command ATDphonenumber. As such, the second device may use the network establishment data accordingly.

In one embodiment the second device is programmed to understand the "D" command as indicating that network establishment parameters are attached to the standard modem command. Thus the command ATDphonenumber is interpreted by the receiving device as (START, NETWORK PARAMETERS=phonenumber). The "AT" command is the start command, the "D" command indicates that network parameters are attached, and the "phonenumber" command contains those network parameters. As mentioned above, it may make no difference whether the first device is not programmed to interpret the ATDphonenumber command in the same manner as the second device.

The above embodiment illustrated with reference to the command ATDphonenumber is exemplary. However, any command in the Hayes command set or any other modem command set could be used to realize the present invention.

It should be understood that the present invention is in no way limited to any particular command. The modem interface commands AT and D used for the illustration above are merely two examples of commands that could be used to realize the present invention. Moreover, it is understood that the commands within the Hayes modem command set are merely a subset of the potential modem commands that could be used to implement the present invention. Additional exemplary embodiments of the present invention are shown in the following sections 1.1.1.1 through 1.1.1.1.7.

1.1.1.1 Modem Emulation Mode

The intention of this mode of operation is for point to point communications between two Picolink radios. After the radio is reset the radio will process any incoming data from the host. If data is received while R TS is asserted the radio will process the data looking for 'AT' commands. If any 'AT' commands are received, the radio will automatically enter the modem emulation mode. Once this mode is set the radio will respond to certain 'AT' commands. In this mode it is easy for a terminal emulation program or any program that can communicate with a modem to easily create or join a point to point network. If at any time the radio receives a command to enter smart mode, the current network (if one exists) will be immediately terminated.

The radio will respond to the 'AT' commands listed in the table below:

| Command | Description |
|---|---|
| ATA | Radio will join any network |
| ATD [T, P] | Radio will either create or join a network |
| ATH | Radio will terminate the active network |
| ATO | Radio will leave command mode and go back online |
| ATQ | Radio will not send responses if QUIET mode is enabled |
| ATV | Radio will send text responses if enabled, numeric response if disabled |
| +++ | Radio will enter command mode |

Any other received commands that are not listed above will receive an OK response, and the command will be ignored by the radio.

The radio will return the following verbose responses; 'OK' and 'CONNECT' or the associated numeric responses '0' and '14'.

1.1.1.1.1 ATA Command

When the radio receives this command the radio will begin looking for any network to join. If a network is found, the radio will join the network and return a 'CONNECT' or '14' response if QUIET mode is disabled. At this time the CD (Carrier Detect) line will be asserted and data transfer can take place between the connected radios.

| Field | Description |
|---|---|
| ATA | Modem auto answer command |

1.1.1.1.2 ATD Command

When the radio receives this command it will either create an infrastructured network or join an infrastructured network of the requested type. Once the network is started or joined the radio Will return a 'CONNECT' or 'I4' response if QUIET mode is disabled. At this time the CD line will be asserted and data transfer can take place between the connected radios.

| Field | Description |
| --- | --- |
| ATD | Modem dial command |
| T, P | T = Tone P = Pulse dialing, this is required but ignored by the radio |
| 0, 1 | 0 = create a network, 1 = join a network |
| NNNNN | Network ID, this value ranges from 0 to 65,534 and identifies the specific network |
| , | Separator between Network ID and Awake Window parameters |
| WWWWW | Awake Window, this value ranges from 0 to 65,535 and indicates how long the radio will remain awake after a message is sent. A value of 65,535 indicates that the radio will remain on. This setting is in 0.1-second increments |
| , | Separator between the Awake window and Info field |
| Info | Up to 32 bytes of text data |

1.1.1.1.3 ATH Command

When the radio receives this command it will cause the current active network to be terminated. Once this command has successfully completed the CD line will be unasserted.

| Field | Description |
| --- | --- |
| ATH | Modem hang-up command |

1.1.1.1.4 ATO Command

When the radio receives this command and the radio is currently in command mode, the radio will go back online and data transfer can once again take place. If the radio is not in command mode, is string will be passed as data.

| Field | Description |
| --- | --- |
| ATO | Modem online command |

1.1.1.1.5 ATQ Command

When the radio receives this command it will either enable or disable QUIET mode for modem responses.

| Field | Description |
| --- | --- |
| ATQ | Modem online command |
| 0, 1 | 0 = disable quiet mode 1 = enable quiet mode |

1.1.1.1.6 ATV Command

When the radio receives this command it will either enable or disable verbose mode. When enabled the radio will return text responses, otherwise it will return numeric responses. The only responses returned by the radio are 'OK', 'CONNECT', '0 ' or 'I4'.

| Field | Description |
| --- | --- |
| ATV | Modem online command |
| 0, 1 | 0 = numeric responses 1 = text responses |

1.1.1.1.7 '+++' Command

When the radio receives a '+++' command when the radio is online, the radio will return to command mode. At this time modem commands can be sent to the radio. This would normally be used to hang-up the modem.

NOTE: under certain conditions long strings of '+' characters could be inadvertently interpreted as the '+++' command.

| Field | Description |
| --- | --- |
| +++ | Enter modem command mode |

Figure 2:
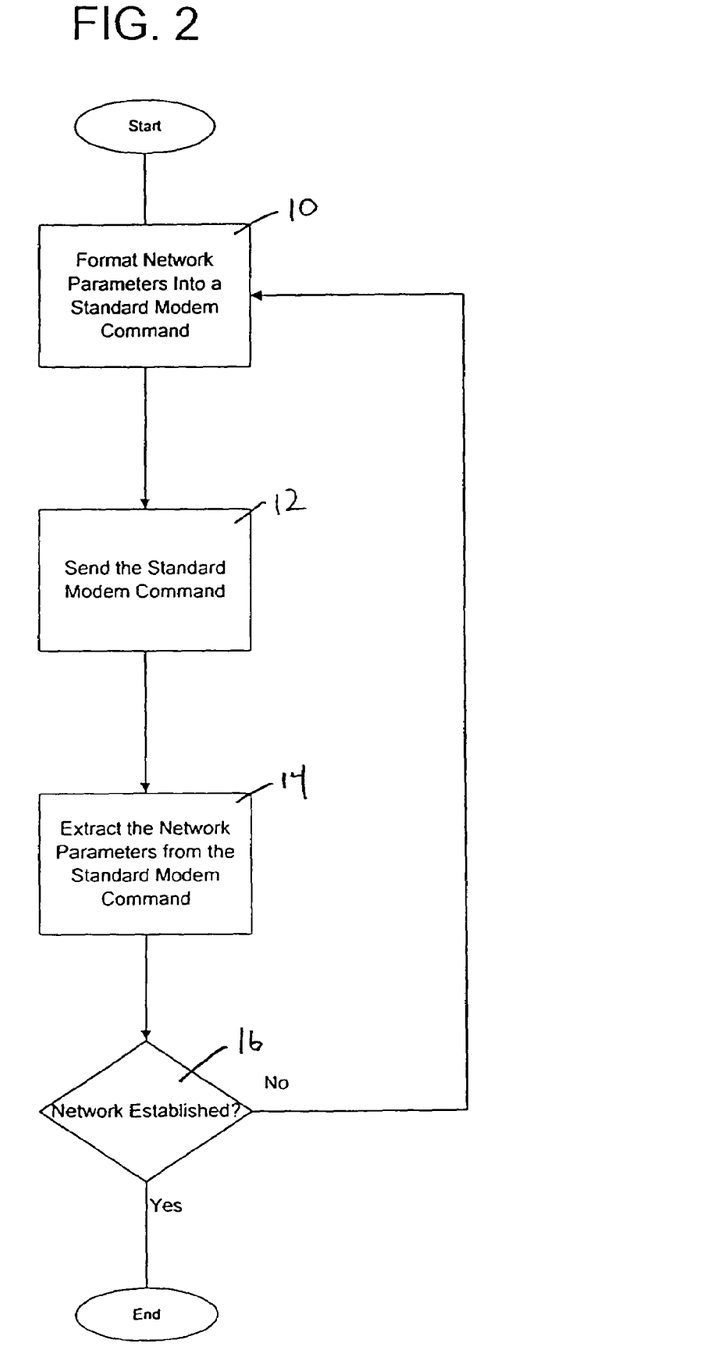
FIG. 2 is another flow diagram showing a method of communicating network parameters in accordance with the present invention.

FIG. 2 is another flow diagram showing a method of communicating network parameters in accordance with the present invention. FIG. 2 is substantially similar to FIG. 1, but adds a functional loop to facilitate repetition of the method in the event that a network is not established. In accordance with FIG. 2 the method may comprise formatting network parameters into a standard modem command 10 and sending the standard modem command 12. The method may also comprise extracting the network parameters from the standard modem command 14. Once steps 10, 12, and 14 have been taken, the method may comprise inquiring whether a network has been established 16. If the network has been established then normal communication or data transmission within the network may ensue. However, if the network has not been established, for whatever reason, steps 10, 12, and 14 may be repeated.

Step 16 may be realized manually by an end user. Alternatively, step 16 may be programmed into the devices to occur automatically in the event that network establishment is unsuccessful. In some embodiments, if network establishment is unsuccessful after a predetermined number of attempts (not shown), the method may terminate without successfully establishing a network.

Figure 3:
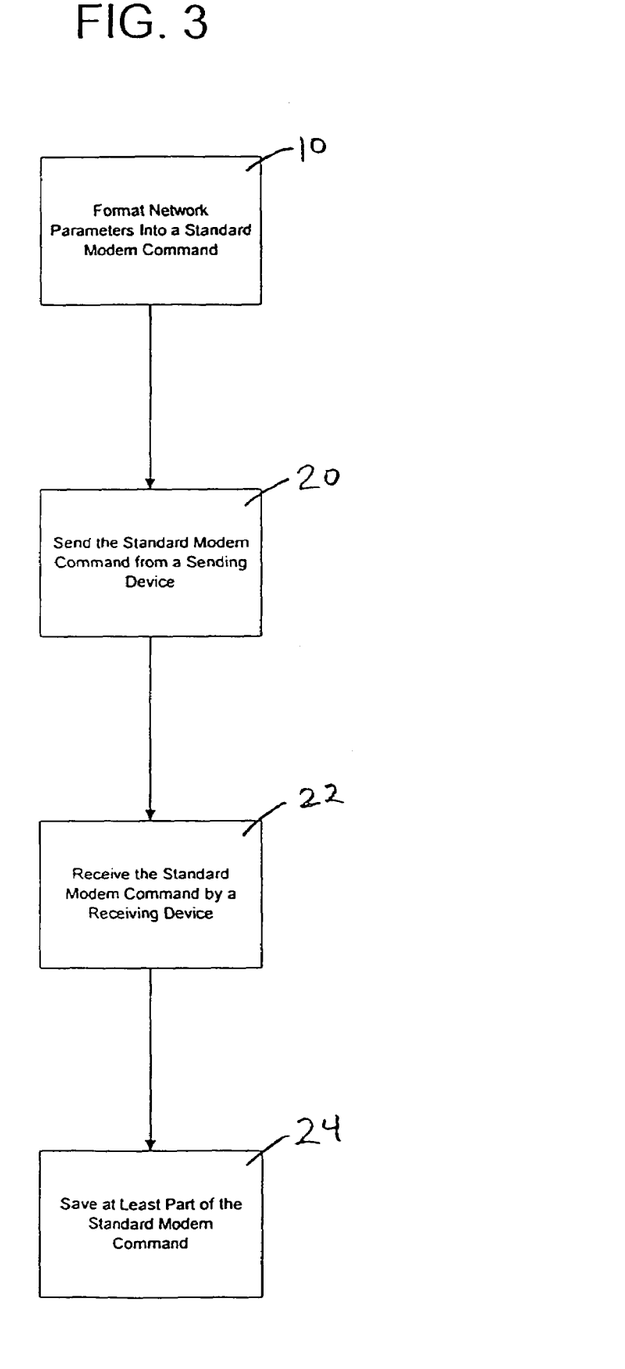
FIG. 3 is another flow diagram showing a method of communicating network parameters in accordance with the present invention.

FIG. 3 is another flow diagram showing a method of communicating network parameters in accordance with the present invention. The method may comprise formatting network parameters into a standard modem command 10 and sending the standard modem command from a sending device 20. The method may also comprise receiving the standard modem command by a receiving device 22 and storing at least part of the standard modem command 24.

The receiving device may store all of the standard modem command or only part of the standard modem command. Moreover, the receiving device may store the command in volatile memory or some non-volatile storage media. In one specific embodiment, at least part of the standard modem command may be stored in an electrically erasable programmable read only memory (EEPROM). In any case, depending on the hardware being used and the network being configured the parameters may be stored either temporarily or permanently.

Figure 4:
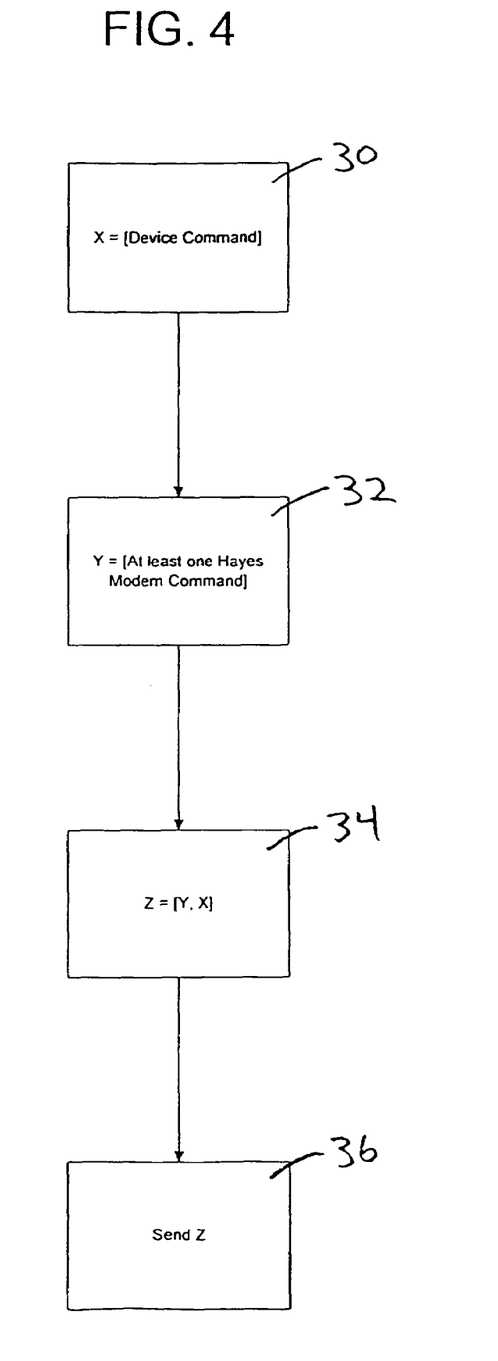
FIG. 4 is a flow diagram showing how a modem command may be created and sent in accordance with the present invention.

FIG. 4 is a flow diagram showing how a modem command may be created and sent in accordance with the present invention. As shown, a device command may be set equal to a defined variable X at step 30. A different variable Y may be set equal to at least one Hayes modem command as shown in step 32. A third variable Z is created by the union of the X and Y variables as shown in step 34. The Z variable, which represents the modem command, may then be sent as shown in step 36.

The device command X may provide network establishment parameters, or alternatively the device command may command the device to perform a particular function. In one embodiment the device command may command the device to enable or disable a particular device function. Alternatively, the device command may simply instruct the device to adjust its settings or operation parameters. In any case, the type of device command that may be implemented in accordance with the present invention is limited only by the hardware and software used in the device.

The Hayes modem command Y may be a single Hayes command or any combination of two or more Hayes modem commands. In step 36, Z may be sent from one device to a second device, or alternatively may be sent from one device to multiple receiving devices. In either case, the sending device and the receiving device(s) may or may not understand either the X, Y, or Z commands in a consistent manner. In other words, the Z command, for example, may mean something to the receiving device that is different from what the Z command means to the sending device. In some embodiments, the sending device may think it is sending a command Z consistent with the Hayes modem command set meaning, while the receiving device will interpret the command Z as the appropriate device command determined by the programming in the receiving device.

Figure 5:
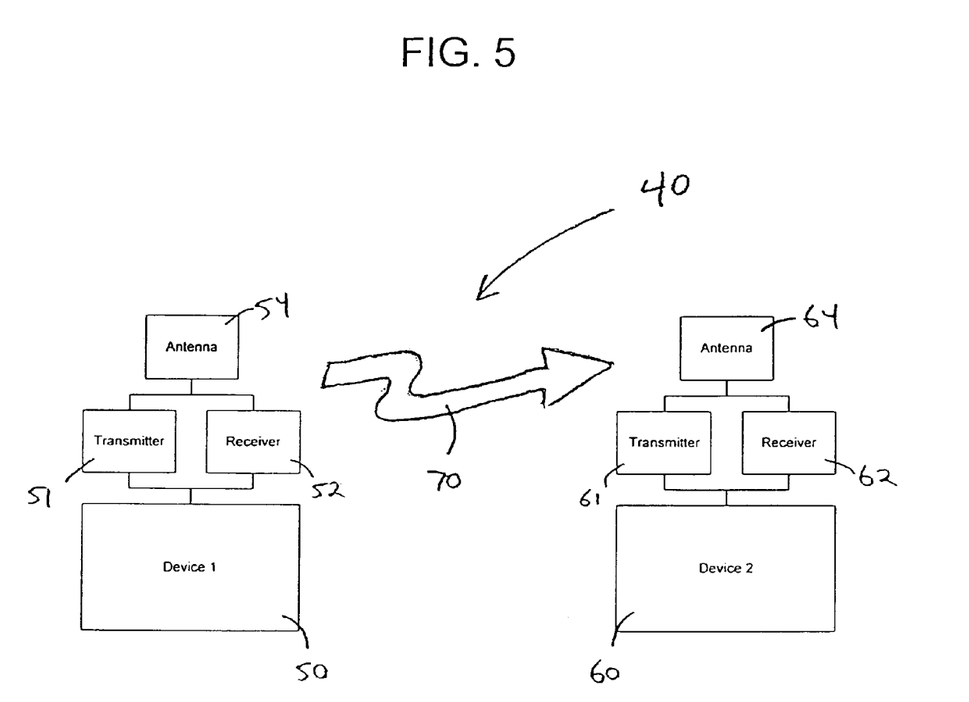
FIG. 5 is a block diagram of a wireless communication system in accordance with the present invention.

FIG. 5 is a block diagram of a wireless communication system in accordance with the present invention. FIG. 5 also illustrates one potential setting for the operation of a method in accordance with the present invention. When a wireless communication network has been established using the methods of the present invention, the result may be a wireless communication system as shown in FIG. 5.

FIG. 5 illustrates a wireless communication system 40 having a first wireless device 50 and a second wireless device 60. By way of example and not limitation the respective wireless devices (50 and 60) may be any on of the following devices: a hand held computer, a printer, a scanner, a bar code reader, a RFID tag reader, a personal computer, any computer peripheral device, a key board, a facsimile machine, a disk drive, a mouse, a display screen, a communication device, an access point, a bridge, a router, a gate, a sensor, a security device, or any other device having electromagnetic radiation reception capabilities.

Wireless devices 50, 60 may each have a transmitter 51, 61 respectively and may also have a receiver 52, 62. Alternatively, transmitter 51, 61 and receiver 52, 62 may be integrated on each respective device and realized with a single transceiver (not shown) on each respective device. Antennas 54, 64 may be used to enhance the reception and transmission of electromagnetic energy. In addition wireless devices 50, 60 may each have memory (not shown).

The number of wireless devices used in realizing a system in accordance with the present invention is unlimited. The system requires only at least one first wireless device 50 and at least one second wireless device 60. The system may comprise at least one network establishment signal 70 having network establishment information formatted into a standard modem command. Wireless communication between the first wireless device and the second wireless device may be established when the network establishment signal 70 is sent from the first wireless device 50 and received by the second wireless device 60.

Figure 6:
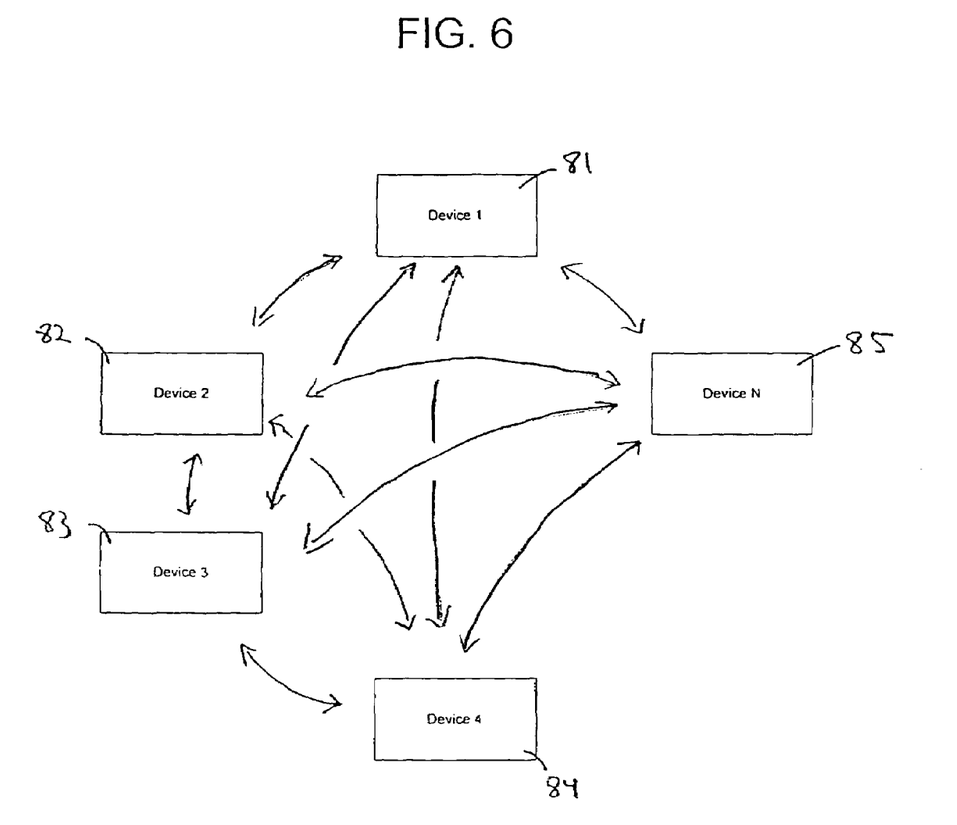
FIG. 6 is another block diagram of a wireless communication system in accordance with the present invention.

FIG. 6 is another block diagram of a wireless communication system 80 in accordance with the present invention. The system may comprise multiple wireless devices 81, 82, 83, 84, 85. Moreover, each respective device may be able to receive or transmit electromagnetic signals to one or more of the other devices in the system 80. The respective signals may have their respective information formatted into a standard modem command. Moreover, the information may command the receiving device in a manner unrelated to the standard interpretation of the respective standard modem command.

One or more wireless device 81, 82, 83, 84, 85 may have a receiver, a transmitter, and an antenna as shown on the devices in FIG. 5. Moreover, one or more wireless devices 81, 82, 83, 84, 85 may have memory (not shown). By way of example and not limitation each of the respective wireless devices 81, 82, 83, 84, 85 may be any on of the following devices: a hand held computer, a printer, a scanner, a bar code reader, a RFID tag reader, a personal computer, any computer peripheral device, a key board, a facsimile machine, a disk drive, a mouse, a display screen, a communication device, an access point, a bridge, a router, a gate, a sensor, a security device, or any other device having electromagnetic radiation reception capabilities.

A number of embodiments of the present invention have been described. Nevertheless, it will be understood that various modifications may be made without departing from the spirit and scope of the invention as defined in the following claims.

We claim:

1. A method of establishing a wireless communication network by means of a first device capable of wireless communication, said method comprising:
    (a) at the first device, before the establishment of a wireless communication network comprising a second device capable of wireless communication, sending via wireless transmission a wireless message utilizing a standard modem command selected from a standard modem command format, but substituting for modem information normally associated with the standard modem command in said standard modem command format, wireless network information which is foreign to said standard modem command format, said wireless network information to be utilized concerning the initial establishment of a wireless communication network including the second device; and
    (b) at the second device receiving the wireless message sent via wireless transmission, and taking action based on the wireless network information which is foreign to said standard modem command format, sent by the first device, for the initial establishment of the wireless communication network accommodating wireless network communication including the second device,
    (c) wherein the wireless network information relates specifically to the initial establishment of wireless linkage in the wireless communication network.

2. A wireless communication system comprising:
    (a) at least one first device capable of wireless communication, for generating at least one network establishment signal having network establishment information incorporated into a standard modern command selected from a standard modem command format, where said network establishment information is foreign to said standard modem command and is not associated with said standard modem command according to said standard modem command format; and
    (b) at least one second device capable of wireless communication;
    (c) said network establishment signal being sent via wireless transmission from the first device and being received by the second device, whereby a wireless communication network comprising the first device and the second device is created pursuant to the network establishment signal having said network establishment information which is foreign to said standard modem command, (d) wherein the network establishment information relates specifically to a wireless linkage in the wireless communication network.

3. A method of communicating with a device having a device wireless communication system capable of wireless communication, said method comprising:

(a) establishing a wireless network including the device wireless communication system by incorporating wireless network establishment information into a standard modem command selected from a standard modem command format where said wireless network establishment information is foreign to said standard modem command and is not associated with said standard modem command according to said standard modem command format, and sending to the device wireless communication system the wireless network establishment information incorporated in said standard modem command; and (b) after the wireless network including the device wireless communication system has been created pursuant to the wireless network establishment information which is foreign to said standard modem command, effecting communication via the newly created network including the device wireless communication system, (c) wherein the wireless network establishment information relates specifically to the creation of wireless linkage in the wireless communication network.

4. A method as in claim 3 wherein after establishment of the wireless communication network comprising the device wireless communication system, a message is generated comprising an instruction utilizing a standard modem command format to leave a response mode where a response is made via wireless transmission to an incoming wireless message, and to enter a quiet mode where no response via wireless transmission is made to an incoming wireless message.

5. A method as in claim 3 wherein after establishment of the wireless communication network comprising the device wireless communication system, a message is generated comprising an instruction utilizing a standard modem command format to leave a quiet mode where a response is not sent to an incoming wireless message, and to enter a response mode where a response is sent via wireless transmission to an incoming wireless message.

6. A method as in claim 3 wherein after establishment of the wireless communication network comprising the device wireless communication system, a message is generated comprising an instruction utilizing a standard modem command format to leave a text response mode where a text response is made via wireless transmission to an incoming wireless message, and to enter a numeric response mode where a numeric response via wireless transmission is made to an incoming wireless message.

7. A method as in claim 3 wherein after establishment of the wireless communication network comprising the device wireless communication system, a message is generated comprising an instruction utilizing a standard modem command format to leave a numeric response mode where a numeric response is made via wireless transmission to an incoming wireless message, and to enter a text response mode where a text response via wireless transmission is made to an incoming wireless message.

8. A wireless communication system comprising:

(a) a device having a device wireless communication subsystem capable of wireless communication, for processing at least one network establishment signal having network establishment information incorporated into a standard modem command selected from a standard modem command format, where said network establishment information is foreign to said standard modem command and is not associated with said standard modem command according to said standard modem command format;

(b) said device wireless communication subsystem being responsive to the network establishment information which is foreign to said standard modem command sent via wireless transmission to become part of a wireless network, (c) wherein the network establishment information relates specifically to a wireless linkage in the wireless communication network.

9. A wireless communication system as in claim 8 wherein the network establishment information comprises a network parameter to be used in becoming part of the wireless network.

10. A wireless communication system comprising:

(a) a device having a device wireless communication subsystem capable of wireless communication, for processing a network establishment signal having identification information incorporated into a standard modem command selected from a standard modem command format, where said identification information is foreign to said standard modem command and is not associated with said standard modem command according to said standard modem command format;

(b) said device wireless communication subsystem receiving the network establishment signal via wireless, and using the identification information which is foreign to said standard modem command to become part of a wireless network, (c) wherein the device wireless communication subsystem is responsive to the identification information to control a wireless linkage per se in the wireless communication network.

11. A wireless communication system comprising:

(a) a device having a device wireless communication subsystem capable of wireless communication, for processing at least one control signal having network operation information incorporated into a standard modem command selected from a standard modem command format, where said network operation information is foreign to said standard modem command and is not associated with said standard modem command according to said standard modem command format;

(b) said device wireless communication subsystem receiving said at least one control signal via wireless transmission, and being responsive to the network operation information which is foreign to said standard modem command to control its operation as part of a wireless network, (c) wherein the device wireless communication subsystem is responsive to netowrk operation information which relates specifically to wireless linkage in the wireless network.

12. A wireless communication system as in claim 11 wherein the network operation information comprises an awake time value to be used during operation in connection with the wireless network.

13. A method of communicating with a device comprising a device wireless communication system capable of wireless communication, said method comprising:
(a) generating at least one control signal having control information incorporated into a standard modem command selected from a standard modem command format, where said control information is foreign to said standard modem command and is not associated with said standard modem command according to said standard modem command format;
(b) sending via wireless transmission directly to the device wireless communication system said control signal having control information incorporated into said standard modem command selected from the standard modem command format, where said control information is foreign to said standard modem command and is not associated with said standard modem command according to said standard modem command format; and
(c) at the device wireless communication system responding to the control information incorporated into said standard modem command selected from the standard modem command format to effect a control operation even though said control information is foreign to said standard modem command and is not associated with said standard modem command according to said standard modem command format.

14. A wireless communication system comprising:
(a) a device having a device wireless communication subsystem capable of wireless communication, for processing at least one control signal having control information incorporated into a standard modem command selected from a standard modem command format, where said control information is foreign to said standard modem command and is not associated with said standard modem command according to said standard modem command format;
(b) said device wireless communication subsystem receiving said control information via wireless transmission directly via a wireless link and being responsive to the control information which is foreign to said standard modem command to effect a control operation even though said control information is foreign to said standard modern command and is not associated with said standard modem command according to said standard modem command format.

15. A wireless communication system according to claim 14 wherein the standard modem command is followed by a number that gives the network identification of a wireless network that the device is to create.

16. A wireless communication system according to claim 14 wherein the standard modem command is followed by a number that gives the network identification of a wireless network that the device is to join.

17. A wireless communication system according to claim 14 wherein the standard modem command is followed by a number that specifies how long the device wireless communication subsystem capable of wireless communication will remain awake after a wireless message is sent.

18. A wireless communication system according to claim 14 wherein the standard modem command is followed by a first number that gives the network identification of a wireless network, and is followed by a second number that specifies how long the device wireless communication subsystem capable of wireless communication will remain awake after a wireless message is sent.

19. A wireless communication system according to claim 14 wherein the standard modem command is followed by a first number that gives the network identification of a wireless network, is followed by a second number that specifies how long the device wireless communication subsystem capable of wireless communication will remain awake after a wireless message is sent, and is followed by text data.

20. A wireless communication system according to claim 14 wherein the standard modem command causes the device to join any wireless network.

* * * * *